C. B. WALKER.
SCREW PROPELLER.
APPLICATION FILED FEB. 18, 1921.
1,374,787.
Patented Apr. 12, 1921.
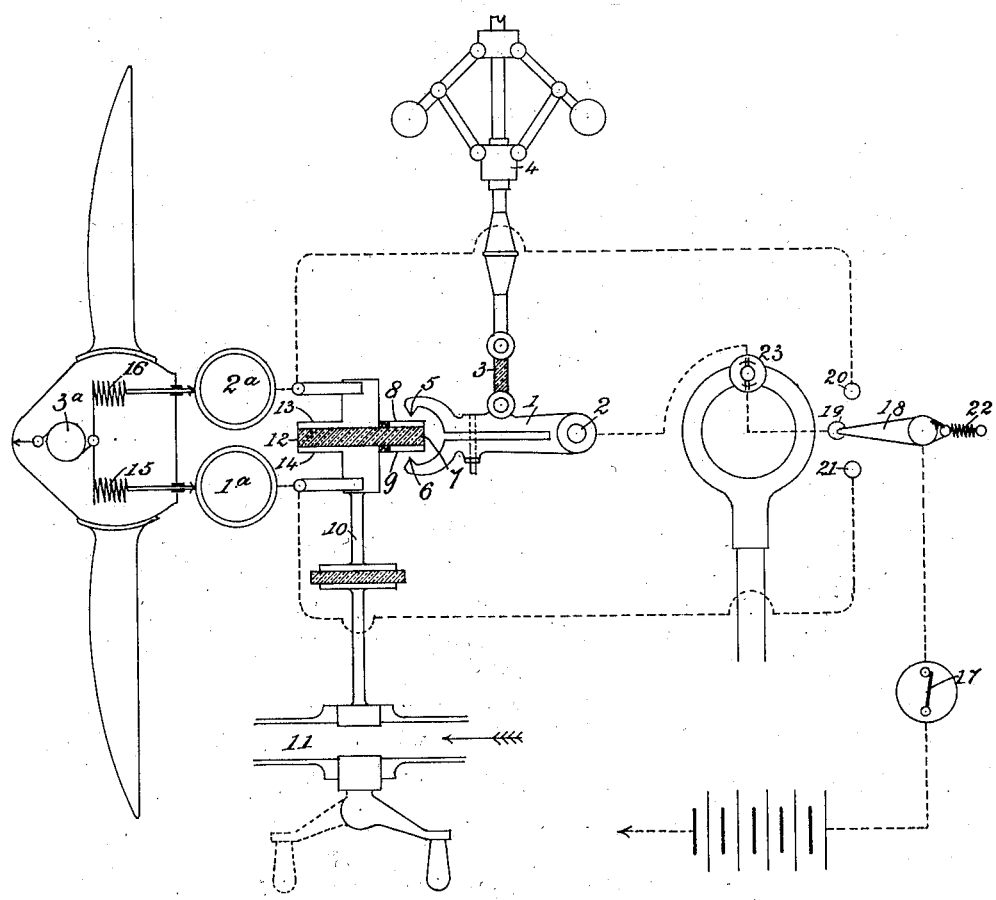
Inventor
Charles Bell Walker
By Frank Chase Somes
Attorney

UNITED STATES PATENT OFFICE.

CHARLES BELL WALKER, OF MOSELEY, ENGLAND.

SCREW-PROPELLER.

1,374,787.     Specification of Letters Patent.     Patented Apr. 12, 1921.

Original application filed July 7, 1920, Serial No. 394,531. Divided and this application filed February 18, 1921. Serial No. 446,170.

*To all whom it may concern:*

Be it known that I, CHARLES BELL WALKER, a subject of the King of Great Britain, and residing at 10 Bloomfield road, Moseley, in the county of Warwick, England, electrical engineer, have invented certain new and useful Improvements in Screw-Propellers, of which the following is a specification.

This application is a division of my application filed July 7, 1920, Serial No. 394,531.

This invention relates more especially to screw propellers of aircraft which are required to fly at different altitudes and in which, consequently, it is of great importance that the blades should be readily reversible and adapted to be automatically set as to pitch in accordance with the altitude, because as an aircraft ascends and the atmosphere becomes more attenuated, the engine exerts less power per revolution, so that the power can only be maintained by increasing the speed of the engine. If the pitch of the propeller is fixed the speed of the engine can only be increased by introducing change-speed gear which is not practicable and, therefore, the automatic changing of the pitch is of great importance. The invention is also in part applicable to propellers of navigable vessels as will be hereinafter made clear. This invention has for its object to provide means whereby the pitch of an aircraft propeller is automatically varied as the aircraft ascends and descends, and has also the further object of providing means whereby, on an increase or a decrease of throttle opening, whether applied to an aircraft engine or an engine of a navigable vessel, the propeller blades will automatically be adjusted to the pitch at which they will give the greatest efficiency of drive for the particular throttle opening.

Means for attaining this end are illustrated, somewhat diagrammatically, as applied to an aircraft in the drawing herewith, in which:—

1 is a lever pivoted at one end to a fixed part of the aircraft by a horizontal pivot axis 2, and is connected at about its middle by a suitable insulated link 3 to a governor 4 arranged to turn about a vertical axis. The lever is bifurcated at its free end and carries at the opposing inner faces of the bifurcations a pair of contact points 5, 6. Positioned between such points is a contact arm 7 for forward driving carried from a fixed part of the aircraft and having two contact plates 8 and 9. Normally both contact plates are out of contact with the contact points, but, if the governor should lift the lever by a small amount, the contact point 6 makes contact with the plate 9 and conversely, if the governor lowers the lever, the contact point 5 makes contact with the plate 8. The lever 1 may be placed in electrical contact with one of the terminals of a battery of which the other terminal is earthed. The plates are in electrical contact each with one of two slip rings $1^a$ and $2^a$. The latter are respectively connected to field coils 15 and 16 of a motor $3^a$ which is drivingly connected with the propeller blades and serves to turn them about their longitudinal axes. The gearing connecting the motor with the blades is not shown, and may be of any suitable character, provided the speed of axial rotation of the blades is very small compared with the speed of the motor. The ends of the field winding connect to one of the armature terminals as shown, the other armature terminal being earthed. The contact arm 7 is carried upon a spindle 10 which is controlled by the throttle 11 in such a way that the opening of the throttle causes the arm, in effect to move upward and conversely the closing of the throttle causes it to move downward. This may be effected by making the arm in the form of a part of a helix, (not indicated in the drawing) so that the turning of the spindle as the throttle area is increased will turn the arm and expose to the contact points a portion of the arm which is on a higher plane. A second or reverse arm 12 is carried at the opposite side of the spindle and is shaped similarly to the first mentioned arm, and has its upper plate 13 connected electrically across to the plate 9 of the forward arm while its lower plate 14 is electrically connected across to the plate 8 of the forward arm. The action of the apparatus is as follows:—

As the aircraft ascends the engine loses power owing to the decreasing density of the air and its speed is reduced causing further loss of power and the governor lowers the lever. Then assuming the throttle is kept at the same opening, the contact point 5 makes contact with the plate 8 and completes a circuit through the field coil 15 and the armature of the motor, so that the latter rotates and reduces the pitch of the blades with consequent reduction of load on the engine, which accordingly speeds up until the point 5 is lifted from contact with the plate 8. The action when the aircraft descends is similar, the contact point 6 then contacting with the plate 9 and causing the motor to run in the reverse direction by bringing the field coil 16 into the circuit. If the throttle 11 is turned to increase the throttle area a portion of the arm which is on the higher horizontal plane is presented to the lever so that the plate 8 makes contact with the point 5 and reduces the pitch of the blades causing the engine further to speed up until such time as its increased speed brings the contact point 6 into contact with the plate 9 and again increases the pitch to that at which the engine will give maximum power for the new throttle area, conversely, if the throttle area is reduced, the contact point 6 first makes contact with the plate 9 increasing the pitch of the blades and slowing the engine until the governor moves the contact point 6 out of contact. The engine being overloaded for the new throttle area slows until the contact point 5 makes contact and decreases the pitch allowing the engine to speed up to give its maximum power for the new throttle opening.

When it is required to reverse the pitch of the blades, the throttle 11 is first closed and then opened again by further rotation in the same direction. This presents the other arm 12 to the contact points, and the contact point 6 then being in contact with the plate 14 still further reduces the pitch until the blades become reversed and then continues to increase reverse pitch. The further turning of the throttle in the same direction however, causes increase of throttle area and increase in engine speed which keeps the contact point 6 in contact still further increasing the reverse pitch until the increasing load slows the engine sufficiently to cause the governor to bring the point 6 out of contact. The propeller is now acting as a very powerful brake to reduce the speed of the aircraft, which is a very great desideratum when landing. If the proper pitch to insure efficient braking be exceeded, the engine slows still further, causing the contact 5 to make contact with the plate 13 which will cause the pitch to be reduced and the engine to speed up until the pitch is such as to give maximum braking effect for the particular throttle opening adopted.

Apparatus similar to that above described may be used in conjunction with the throttle of a steam turbine of a navigable vessel, whereby the pitch of the blades may be automatically varied, with changing load, to permit the turbine always to run at a speed at which it gives its maximum power for a given opening of throttle.

The portion of the circuit from the battery to the lever 1 may include one or more switches, for instance a master switch 17 by which the apparatus may be thrown out of action, it being undesirable, in some cases, that the apparatus should be functioning all the time, and also a pilot's switch 18 arranged as a three-way switch having a midway position for automatic working through a contact 19, and a position to either side thereof through plates 20 and 21 whereby the blades can be adjusted to any desired extent either way, independently of the automatic apparatus. 22 is a spring which keeps the switch 18 in its mid-way position except when moved to either of its other positions by hand. 23 is a second pilot's switch on the control lever to cut out the automatic apparatus if desired.

Having fully described my invention, what I claim and desire to secure by Letters Patent is:—

1. Means by which the blades of a propeller may be varied as to pitch automatically with change of altitude or load, comprising a governor, an arm controlled by said governor, a pair of contact points on said arm, a corresponding pair of independently carried contact plates with one of which alternatively one of the said contact points is adapted to make contact, and electrically controlled means whereby, when one of said contact points on said arm makes contact, the pitch of the blades is caused to be increased, and whereby, when the other of said points makes contact, the pitch of the blades is caused to be decreased, according as the speed of the engine increases or decreases.

2. Means by which the blades of a propeller may be varied as to pitch automatically with change of altitude or load, comprising a governor, an arm controlled by said governor, a pair of contact points on said arm, a corresponding pair of independently carried contact plates, with one of which alternatively one of said contact points is adapted to make contact, electrically controlled means whereby, when one of said contact points on said arm makes contact, the pitch of the blades is caused to be increased and whereby when the other of said points makes contact the pitch of the blades is caused to be decreased, according as the speed of the engine increases or decreases, and a second pair of plates electrically connected crosswise to the first mentioned pair of plates and adapted to be brought into operation in lieu thereof, whereby the contacting of the contact points will have the reverse effect upon the propeller blades.

3. Means by which the blades of a propeller may be varied as to pitch automatically with change of altitude or load, comprising a governor, an arm controlled by said governor, a pair of contact points on said arm, a corresponding pair of independently carried contact plates with one of which alternatively one of said contact points is adapted to make contact, electrically controlled means whereby, when one of said contact points on said arm makes contact, the pitch of the blades is caused to be increased and whereby, when the other of said points makes contact, the pitch of the blades is caused to be decreased, according as the speed of the engine increases or decreases, an arm carrying said contact plates and mounted upon a spindle which may be rotated and said plates arranged in the form of a helix whereby, when the spindle is rotated, the relative effective position of the plates to the contact points may be altered.

4. Means by which the blades of a propeller may be varied as to pitch automatically with change of altitude or load, comprising a governor, an arm controlled by said governor, a pair of contact points on said arm, a corresponding pair of independently carried contact plates with one of which alternatively one of said contact points is adapted to make contact, electrically controlled means whereby, when one of said contact points on said arm makes contact, the pitch of the blades is caused to be increased and whereby, when the other of said points makes contact, the pitch of the blades is caused to be decreased, according as the speed of the engine increases or decreases, a second pair of plates electrically connected crosswise to the first mentioned pair of plates and adapted to be brought into operation in lieu thereof, whereby the contacting of the contact points will have the reverse effect upon the propeller blades, said arm carrying said contact plates mounted upon a spindle which may be rotated, and said plates arranged in the form of a helix, whereby, when the spindle is rotated, the relative effective position of the plates to the contact points may be altered.

5. Means by which the blades of a propeller may be varied as to pitch automatically with change of altitude or load, comprising a governor, an arm controlled by said governor, a pair of contact points on said arm, a corresponding pair of independently carried contact plates with one of which alternatively one of said contact points is adapted to make contact, electrically controlled means whereby, when one of said contact points on said arm makes contact, the pitch of the blades is caused to be increased and whereby, when the other of said points makes contact, the pitch of the blades is caused to be decreased, according as the speed of the engine increases or decreases, said arm carrying said contact plates mounted upon a spindle which may be rotated, said plates arranged in the form of a helix whereby when the spindle is rotated the relative effective position of the plates to the contact points may be altered and said spindle connected with the throttle of the engine whereby the effective position of the plates relative to the contacts is altered in accordance with alteration of the throttle opening.

6. Means by which the blades of a propeller may be varied as to pitch automatically with change of altitude or load, comprising a governor, an arm controlled by said governor, a pair of contact points on said arm, a corresponding pair of independently carried contact plates with one of which alternatively one of said contact points is adapted to make contact, electrically controlled means whereby, when one of said contact points on said arm makes contact, the pitch of the blades is caused to be increased and whereby, when the other of said points makes contact, the pitch of the blades is caused to be decreased, according as the speed of the engine increases or decreases, a second pair of plates electrically connected crosswise to the first mentioned pair of plates and adapted to be brought into operation in lieu thereof, whereby the contacting of the contact points will have the reverse effect upon the propeller blades, an arm carrying said contact plates mounted upon a spindle which may be rotated and said plates arranged in the form of an helix whereby, when the spindle is rotated, the relative effective position of the plates to the contact points may be altered, and said spindle connected with the throttle of the engine, whereby the effective position of the plates relative to the contacts is altered in accordance with the alteration of the throttle opening.

In witness whereof I have hereunto signed my name this 29th day of January 1921 in the presence of two subscribing witnesses.

CHARLES BELL WALKER.

Witnesses:
  THOMAS JOHN GEE,
  PERCY E. CASWELL.